(12) United States Patent
Delplace et al.

(10) Patent No.: US 11,956,417 B2
(45) Date of Patent: Apr. 9, 2024

(54) METHOD OF MEASURING VIDEO LATENCY

(71) Applicant: SAGEMCOM BROADBAND SAS, Rueil Malmaison (FR)

(72) Inventors: Stéphane Delplace, Rueil Malmaison (FR); Benjamin Gavalda, Rueil Malmaison (FR); Jérôme Berger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 261 days.

(21) Appl. No.: 17/097,974

(22) Filed: Nov. 13, 2020

(65) Prior Publication Data
US 2021/0152813 A1 May 20, 2021

(30) Foreign Application Priority Data
Nov. 14, 2019 (FR) .................... 19 12733

(51) Int. Cl.
*H04N 9/475* (2006.01)
*H04B 17/364* (2015.01)
*H04N 17/00* (2006.01)
*H04N 21/234* (2011.01)

(52) U.S. Cl.
CPC ......... *H04N 17/004* (2013.01); *H04B 17/364* (2015.01); *H04N 17/002* (2013.01); *H04N 21/23418* (2013.01)

(58) Field of Classification Search
CPC ............... H04N 17/004; H04N 17/002; H04N 21/23418; H04N 17/00; H04N 17/02; H04N 9/475; H04B 17/364

USPC ......................................... 348/180, 191, 512
See application file for complete search history.

(56) References Cited

U.S. PATENT DOCUMENTS

| | | | | |
|---|---|---|---|---|
| 8,330,792 | B2* | 12/2012 | Beers ...................... | H04L 43/10 348/14.1 |
| 8,525,885 | B2* | 9/2013 | Steinberg ............... | H04N 17/04 348/192 |
| 8,957,972 | B2* | 2/2015 | Gluskin ................. | H04N 17/00 348/192 |
| 11,206,393 | B2* | 12/2021 | Lee ........................ | G06T 7/0002 |
| 2007/0220561 | A1 | 9/2007 | Girardeau et al. | |

(Continued)

FOREIGN PATENT DOCUMENTS

EP 2857973 A1 4/2015

*Primary Examiner* — Trang U Tran
(74) *Attorney, Agent, or Firm* — Muncy, Geissler, Olds & Lowe, P.C.

(57) ABSTRACT

A measurement method for measuring video latency induced by a piece of video playback equipment that is connected to a piece of decoder equipment having a photosensitive sensor incorporated therein, the method including the steps of: causing a screen of the video playback equipment to generate emitted light test signals; using the photosensitive sensor to acquire captured light signals including received light test signals resulting from the emitted light test signals being reflected on at least one surface of surroundings of the video playback equipment; acquiring measurement signals produced by the photosensitive sensor from the captured light signals, and analyzing the measurement signals in order to obtain a video latency measurement.

12 Claims, 2 Drawing Sheets

(56) References Cited

U.S. PATENT DOCUMENTS

2014/0267561 A1 9/2014 Ahuja et al.
2019/0098293 A1 3/2019 Lee et al.

* cited by examiner

METHOD OF MEASURING VIDEO LATENCY

The invention relates to the field of synchronizing an image signal produced by video playback equipment with a sound signal produced by audio playback equipment that is distinct from the video playback equipment.

BACKGROUND OF THE INVENTION

Nowadays, in modern home multimedia installations, it is very frequent for decoder equipment to be connected both to video playback equipment and also to one or more pieces of audio playback equipment that are distinct from the video playback equipment, for the purpose of improving a user's listening experience during playback of audio/video content (e.g. a film).

By way of example, such a multimedia installation thus comprises a decoder (or "set-top") box that is connected to a television set and to external loudspeakers. The user may choose to cause the sound signal to be played back solely by the external loudspeakers, since their audio performance is better than that of loudspeakers incorporated in the television set.

In this type of installation, the video playback equipment and the audio playback equipment are totally independent and cannot synchronize mutually. In order to achieve synchronization, it is thus possible for the times taken to process and to play back the audio and video components to be taken into account upstream only.

It is therefore appropriate in particular to measure video latency, which corresponds to the difference in time between a video signal being made available to the video playback equipment and the corresponding image being displayed on the screen of the video playback equipment.

Several methods are known for determining video latency.

When the decoder equipment is connected to the video playback equipment by a high definition multimedia interface (HDMI) link, a first method consists in recovering this information directly from the video playback equipment by making use of the consumer electronic control (CEC) standard for the lip-sync function. Nevertheless, since that function is optional, in practice it is frequently not implemented, and it is rarely available for use.

A second method consists in synchronizing the image signal and the sound signal by using external audio/video acquisition equipment, e.g. a smartphone. That second method is not automatic and it requires the user to install a dedicated application and to perform a certain number of operations, and in particular an audio capture operation. That second method can also lead to extra expense. Above all, that second method can be complicated to perform, in particular for users who are not used to using new technologies.

OBJECT OF THE INVENTION

An object of the invention is to measure the video latency induced by video playback equipment, and to do so in a manner that is simple, automatic, and inexpensive.

SUMMARY OF THE INVENTION

In order to achieve this object, there is provided a measurement method for measuring video latency induced by a piece of video playback equipment that is connected to a piece of decoder equipment having a photosensitive sensor incorporated therein, the measurement method being performed in the decoder equipment and including a measurement stage comprising the steps of:
 causing a screen of the video playback equipment to generate emitted light test signals;
 using the photosensitive sensor to acquire captured light signals including received light test signals resulting from the emitted light test signals being reflected on at least one surface of surroundings of the video playback equipment;
 acquiring measurement signals produced by the photosensitive sensor from the captured light signals, and analyzing the measurement signals in order to obtain a video latency measurement.

The measurement method of the invention thus makes it possible to obtain a measurement of video latency induced by the video playback equipment in a manner that is simple, that is completely automatic, and that does not require any particular interaction with the user. For this purpose, advantage is taken of the photosensitive sensor (which may for example be a brightness sensor or a camera) that is incorporated in the decoder equipment without being initially provided for this function.

The measurement method can thus be performed without requiring any modification to the hardware of the decoder equipment and it therefore does not generate extra cost.

The measurement method does not require external equipment to be used.

Furthermore, there is no need to position or point the decoder equipment in any particular way, since the measurement method does not require the photosensitive sensor to be placed facing or looking at the screen of the video playback equipment. Specifically, the photosensitive sensor senses "indirectly" the effect that the emitted light test signals have on the surroundings of the video playback equipment.

There is also provided a measurement method as described above, wherein the emitted light test signals comprise a succession of flashes of light.

There is also provided a measurement method as described above, wherein the flashes of light present different first durations and/or the flashes of light are spaced apart by different second durations.

There is also provided a measurement method as described above, wherein the photosensitive sensor is a brightness sensor, and wherein the flashes of light are flashes of white light.

There is also provided a measurement method as described above, wherein the photosensitive sensor is a camera, with the measurement method further comprising a preliminary step of determining an optimum color that presents the best detection rate by the camera, the flashes of light then having the optimum color.

There is also provided a measurement method as described above, wherein the measurement signals are digitized in order to obtain digital measurement signals, and wherein the analysis of the measurement signals comprises a step of calculating a correlation between the digital measurement signals and digital test signals produced by the decoder equipment and from which the emitted light test signals are generated.

There is also provided a measurement method as described above, wherein the decoder equipment is arranged to configure an output to which the video playback equipment is connected with a plurality of video configurations, each defined by one or more particular video characteristics, and wherein the measurement stage is repeated for each video configuration so as to produce a video latency measurement for each video configuration.

There is also provided a measurement method as described above, wherein the measurement stage is reiterated several times and wherein, at the end of each measurement stage, the video latency measurement is stored and a statistical test is performed in order to evaluate the accuracy of said video latency measurement, the measurement stage being reiterated until the accuracy reaches a target value.

There is also provided a measurement method as described above, wherein the statistical test is a Student's t-test.

There is also provided a synchronization method for synchronizing a piece of video playback equipment with at least one piece of audio playback equipment, each said piece of equipment being connected to a piece of decoder equipment, the synchronization method comprising the steps of:
performing the above-described measurement method;
estimating, measuring, or acquiring a value for the audio latency induced by the audio playback equipment;
calculating a latency difference from the video latency measurement and the audio latency value, and synchronizing the video playback equipment and the audio playback equipment by using the latency difference.

There is also provided decoder equipment including a processor component arranged to perform the measurement method as described above.

There is also provided a computer program including instructions that cause the processor component of the decoder equipment as described above to execute the steps of the measurement method as mentioned above.

There is also provided a computer readable storage medium, having stored thereon the computer program as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
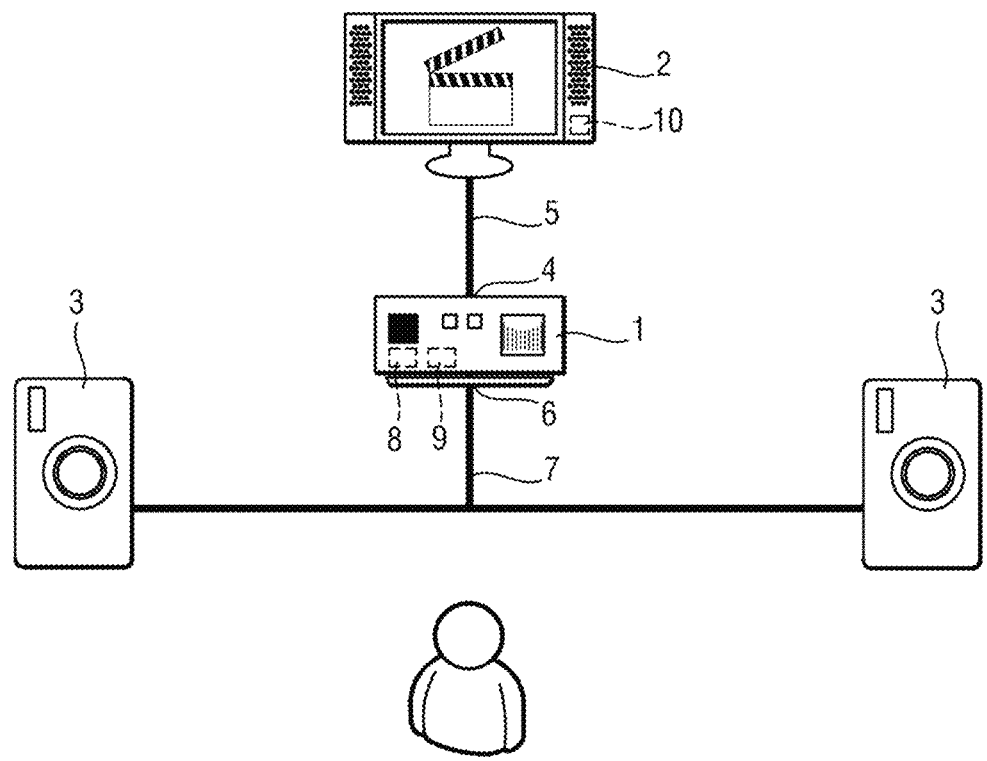
FIG. 1 shows a television set, a decoder box, and two external loudspeakers.

In this example, the invention is performed in a multimedia installation that comprises a decoder box 1, a television set 2, and external loudspeakers 3.

A television set 2 is connected to an audio/video output 4 of the decoder box 1 via a main audio/video link 5, while the external loudspeakers 3 are connected to an audio output 6 of the decoder box 1 via a secondary audio link 7. The main audio/video link 5 and the secondary audio link 7 may make use of any appropriate wired or wireless technology.

In this example, the decoder box 1 is positioned in the proximity of the television set 2, e.g. under it or beside it.

A photosensitive sensor is incorporated in the decoder box 1. In this example, a photosensitive sensor is a brightness sensor 8.

The decoder box 1 further includes a processor component 9 adapted to execute instructions of a program for performing the measurement method of the invention. In this example, the processor component 9 is a microcontroller, however it could be a different component, e.g. a field programmable gate array (FPGA) or an application specific integrated circuit (ASIC).

The television set 2 includes video processor means 10 that process the video signal delivered by the decoder box 1 via its audio/video output 4.

The measurement method of the invention is for measuring the video latency induced by the television set 2. The video latency measurement is used to synchronize the television set 2 with the external loudspeakers 3.

Figure 2:
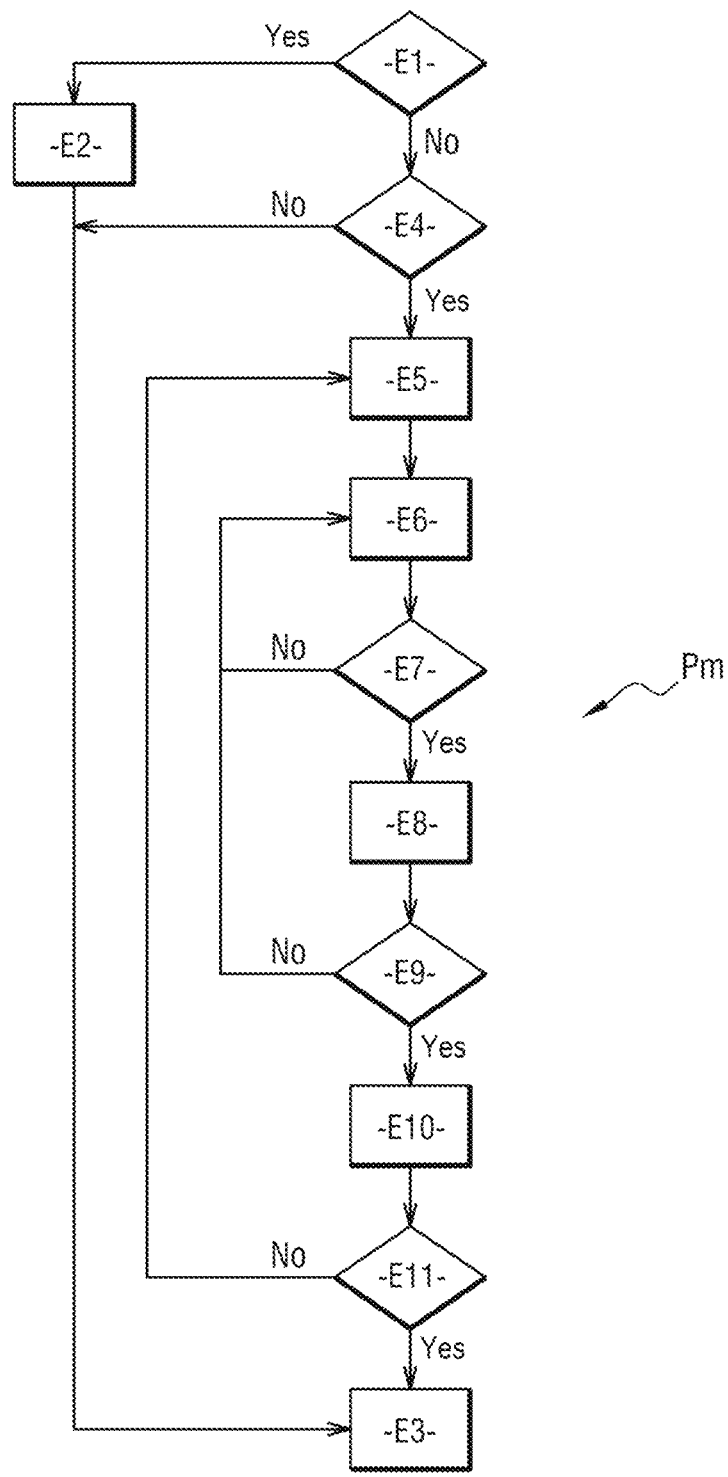
FIG. 2 shows steps of the measurement method of the invention.

With reference to FIG. 2, the measurement method consists initially in using the lip-sync function of the CEC standard to determine whether a video latency estimate is available in the television set 2 and is thus directly accessible. By way of example, the video latency estimate may be stored in a memory of the video processor means 10 of the television set 2 (step E1).

If a video latency estimate is directly accessible, the decoder box 1 acquires the video latency estimate and considers that the video latency value of the television set 2 is equal to that video latency estimate (step E2). The measurement method then comes to an end (step E3).

If such a video latency estimate is not available, the measurement method then consists in verifying that the decoder box 1 does indeed include a photosensitive sensor (step E4).

If it does not, the measurement method comes to an end (step E3).

If the decoder box 1 does indeed include a photosensitive sensor, as in this example (the brightness sensor 8), then the measurement method comprises a configuration step (step E5).

The decoder box 1 is arranged to configure the audio/video output 4 to which the television set 2 is connected with a plurality of video configurations, each of which is defined by one or more particular video characteristics.

Specifically, the video latency introduced by the television set 2 may depend on video characteristics applied by the decoder box 1 on its audio/video output 4. By way of example, the video characteristics may be as follows:
resolution: SD/HD/FHD/4K, etc.;
refresh rate (in images per second or hertz (Hz)): 24 Hz/25 Hz/29.97 Hz/30 Hz/50 Hz/59.94 Hz/60 Hz/100 Hz/120 Hz, etc.;
color space used: BT.709, BT.2020, etc.;
management of audio or video metadata: SMPTE-2084, Dolby Vision, MAT 2.0, etc.

During step E5, the decoder box 1 thus configures the audio/video output 4 with a particular video configuration, referred to as the "current" video configuration.

Thereafter, the measurement method comprises a measurement stage (stage Pm) for the purpose of producing a measurement of the video latency of the television set 2 with the current video configuration.

The processor component 9 of the decoder box 1 generates digital test signals. The decoder box 1 delivers these digital test signals to the video processor means 10 of the television set 2.

The decoder box 1 then controls the television set 2 so that the screen of the television set 2 generates emitted light test signals (step E6). The emitted light test signals are produced from the digital test signals. The emitted light test signals are defined to produce a predefined pattern. The term "pattern" is used to mean the way the emitted light test signals vary over time.

Thereafter, the decoder box 1 uses the brightness sensor 8 to acquire captured light signals including received light test signals resulting from the emitted light test signals being reflected on at least one surface in the surroundings of the television set 2.

The brightness sensor 8 is not positioned facing the screen of the television set 2 and it therefore does not capture the emitted light test signals "directly". The brightness sensor 8 acquires captured light signals coming from the surroundings of the television set 2 and including the received light test signals that correspond to the emitted light test signals as reflected by one or more surfaces in the proximity of the television set 2: a wall, a piece of furniture, the ceiling, etc.

The effect of the emitted light test signals on the surroundings of the television set 2 is thus captured "indirectly" by the brightness sensor 8. It should be observed that it is necessary for the decoder box 1 to be positioned in such a manner that the brightness sensor 8 is capable of acquiring captured light signals that include the received light test signals: for example, the decoder box 1 must thus not be located in a cupboard that is closed by a door that is opaque.

The pattern is emitted at time t0 and it has a duration d_p.

The brightness sensor 8 introduces a known measurement latency, written l_cl.

Capture starts at t0 and ends at t1. The time t1 is the sum of the duration of the pattern d_p plus a guard time written d_g, corresponding to the maximum latency that can be accommodated by the synchronization system.

During a step E7, the processor component 9 waits for the end of the pattern. So long as the entire pattern has not been detected, or else so long as the duration d_p+d_g has not been exceeded, step E6 continues.

At time t_fdp, the brightness sensor 8 has detected the entire pattern.

The processor component 9 of the decoder box 1 acquires measurement signals produced by the brightness sensor 8 from the captured light signals, and it analyzes the measurement signals in order to obtain a video latency measurement.

In this example, the measurement signals are analog signals that are digitized by an analog-to-digital converter (ADC) (optionally incorporated in the processor component 9) in order to obtain digital measurement signals.

The processor component 9 then calculates a correlation between the digital measurement signals and the digital test signals produced by the decoder box 1 and from which the emitted light test signals were generated.

The correlation calculation serves to estimate a video latency measurement t_lv (step E8):

$$t\_lv = t\_fdp - d\_p - t0 - l\_cl.$$

The video latency measurement is then stored.

It should be observed that, when estimating the video latency measurement, the pattern used for the emitted light test signals serves to avoid taking account of interfering lights variations that might be present in the surroundings of the television set: switching on a light, opening a shutter, light harmonics caused by the lighting, mains frequency, etc.

The pattern is also defined in such a manner as to enable algorithms for processing the signal to obtain a meaningful measurement. The Nyquist criterion must be satisfied, and the frequency of the pattern must be lower than the frequency at which the brightness sensor 8 is sampled by a factor of at least 2 to 4.

In this example, the brightness sensor 8 is sampled at a frequency equal to 5 Hz.

In order to satisfy these requirements and to enable an accurate and reliable measurement of the video latency to be obtained, the pattern is such that the emitted light test signals comprise a succession of flashes of white light. These flashes of white light are spaced apart by durations corresponding to the screen of the television set 2 having a black display.

The flashes of white light and the black displays of the pattern must have a duration longer than 200 milliseconds (ms) (i.e. ⅕ Hz) and preferably not less than 400 ms (i.e. ⅖ Hz).

An example of a time definition for the pattern is as follows:
  a flash of white light having a duration of 400 ms;
  a black display on the screen having a duration of 400 ms;
  a flash of white light having a duration of 1200 ms;
  a black display on the screen having a duration of 800 ms.

The flash of white light having a duration of 400 ms and the flash of white light having a duration of 1200 ms are thus spaced apart by a duration of 400 ms (which corresponds to a black display on the screen having a duration of 400 ms). The 1200 ms flash of light and the following flash of light are spaced apart by a duration of 800 ms (which corresponds to a black display on the screen having a duration of 800 ms).

It can be seen that the flashes of white light present different first durations (equal in this example to 400 ms and 1200 ms), and that the flashes of light are spaced apart by different second durations (equal in this example to 400 ms and 800 ms). This pattern makes it possible to avoid the measurement being disturbed by interfering light variations as mentioned above.

The measurement stage Pm is then reiterated several times.

At the end of each measurement stage Pm, the video latency measurement is stored and a statistical test is performed with the preceding results in order to evaluate the accuracy of the video latency measurement. By way of example, the statistical test may be Student's t-test (step E9).

So long as the target statistical accuracy e_target has not been reached, the measurement stage is repeated.

When the statistical accuracy e_target is reached, or else when the number of iterations reaches a predetermined threshold, the taking of measurements is stopped.

It is assumed that the value of the video latency induced by the television set 2 is equal to the filtered average of the video latency measurements t_lv (step E10).

Good measurement accuracy is thus obtained with a relatively small number of patterns, regardless of whether the surroundings are noisy.

The processor component 9 verifies whether or not the current video configuration is the last of the video configurations to be taken into account (step E11).

If it is, the measurement method comes to an end (step E3).

Otherwise, the configuration step (step E5) is repeated, a new current video configuration is defined, and the video latency is measured for the new current video configuration. A video latency measurement is performed for each video configuration that may be presented by name to the user, i.e. the combinations that are compatible both with the decoder box 1 and the television set 2.

The video latency value as obtained by the above-described measurement method is then used by the decoder box 1 to synchronize the television set 2 with the external loudspeakers 3.

The processor component 9 of the decoder box 1 estimates, measures, or acquires a value for the audio latency induced by the external loudspeakers 3. The processor component 9 calculates a latency difference from the video latency measurement and the audio latency value.

The processor component 9 of the decoder box 1 then synchronizes the television set 2 with the external loudspeakers 3 by using the latency difference.

Naturally, the invention is not limited to the embodiment described, but covers any variant coming within the ambit of the invention as defined by the claims. In this example, the decoder equipment is a set-top box, but it could be any other equipment capable of delivering a synchronized video and audio streams to different pieces of equipment, e.g. a games console, a computer, a smart TV, etc.

In this example, the video playback equipment is a television set, however it could be some other equipment, e.g. a video projector.

It should also be observed that the term "video playback equipment" as used herein naturally also covers audio/video playback equipment.

In this example, each piece of audio playback equipment is an external loudspeaker, however it could be any other equipment including a loudspeaker, e.g. a sound bar.

The photosensitive sensor need not necessarily be a brightness sensor. By way of example, it might be a presence-detection camera arranged to shoot facing the screen of the television set, typically in the user's living room.

Under such circumstances, the measurement method includes a preliminary step consisting in determining an optimum color that presents the best detection rate for the camera. The emitted light test signals then comprise flashes of light having that optimum color, thereby serving to minimize the effect of potential sources of disturbance and/or to improve convergence of the measurement. The way the pattern is defined in time then follows the same logic as is used for a brightness sensor.

The invention claimed is:

1. A measurement method for measuring video latency induced by video playback equipment,
the measurement method being performed in a decoder equipment and including a measurement stage comprising the steps of:
providing the video playback equipment having the screen, and the decoder equipment having a photosensitive sensor, the decoder equipment being connected to the video playback equipment;
emitting light test signals from a screen of the video playback equipment;
capturing, by the photosensitive sensor, reflected light of the light test signals being reflected on at least one surface of surroundings of the screen of the video playback equipment, said surface not being a surface of the screen, so that the reflected light is not captured directly from the screen;
acquiring measurement signals produced by the photosensitive sensor from the captured reflected light, and analyzing the measurement signals; and
obtaining a video latency measurement based on the measurement signals,
wherein the video latency corresponds to a difference in time between a video signal being made available to the video playback equipment and a corresponding image being displayed on a screen of the video playback equipment.

2. The measurement method according to claim 1, wherein the emitted light test signals comprise a succession of flashes of light.

3. The measurement method according to claim 2, wherein the flashes of light present different first durations and/or the flashes of light are spaced apart by different second durations.

4. The measurement method according to claim 2, wherein the photosensitive sensor is a brightness sensor, and wherein the flashes of light are flashes of white light.

5. The measurement method according to claim 2, wherein the photosensitive sensor is a camera, with the measurement method further comprising a preliminary step of determining an optimum color that presents the best detection rate by the camera, the flashes of light then having the optimum color.

6. The measurement method according to claim 1, wherein the measurement signals are digitized in order to obtain digital measurement signals, and wherein the analysis of the measurement signals comprises a step of calculating a correlation between the digital measurement signals and digital test signals produced by the decoder equipment and from which the emitted light test signals are generated.

7. The measurement method according to claim 1, wherein the decoder equipment is arranged to configure an output to which the video playback equipment is connected with a plurality of video configurations, each defined by one or more particular video characteristics, and wherein the measurement stage is repeated for each video configuration so as to produce a video latency measurement for each video configuration.

8. The measurement method according to claim 1, wherein the measurement stage is reiterated several times and wherein, at the end of each measurement stage, the video latency measurement is stored and a statistical test is performed in order to evaluate the accuracy of said video latency measurement, the measurement stage being reiterated until the accuracy reaches a target value.

9. The measurement method according to claim 8, wherein the statistical test is a Student's t-test.

10. A synchronization method for synchronizing video playback equipment with at least audio playback equipment, the synchronization method comprising the steps of:
providing the video playback equipment having a screen, the at least one audio playback equipment, and a decoder equipment having a photosensitive sensor, the decoder equipment being connected to the video playback equipment and the at least one audio playback equipment;
emitting light test signals from the screen of the video playback equipment;
capturing, by the photosensitive sensor, reflected light of the light test signals being reflected on at least one surface of surroundings of the screen of the video playback equipment, said surface not being a surface of the screen, so that the reflected light is not captured directly from the screen;
acquiring measurement signals produced by the photosensitive sensor from the captured reflected light, and analyzing the measurement signals;
estimating, measuring, or acquiring a value for an audio latency induced by the at least one audio playback equipment;
calculating a latency difference from a measurement for video latency and the audio latency value, and synchronizing the video playback equipment and the at least one audio playback equipment by using the latency difference,
wherein the video latency corresponds to a difference in time between a video signal being made available to the video playback equipment and a corresponding image being displayed on a screen of the video playback equipment.

11. Decoder equipment including a photosensitive sensor and a processor component, the decoder equipment being arranged to perform the measurement method according to claim 1.

12. A non-transitory computer readable storage medium having stored thereon a computer program including instructions that causes a decoder equipment according to claim 11 to execute the steps of the measurement method.

* * * * *